United States Patent
Lovell et al.

(10) Patent No.: US 12,450,478 B2
(45) Date of Patent: Oct. 21, 2025

(54) DYNAMIC DATA-DEPENDENT NEURAL NETWORK PROCESSING SYSTEMS AND METHODS

(71) Applicant: Maxim Integrated Products, Inc., San Jose, CA (US)

(72) Inventors: Mark Alan Lovell, Lucas, TX (US); Robert Michael Muchsel, Addison, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 1077 days.

(21) Appl. No.: 17/472,074

(22) Filed: Sep. 10, 2021

(65) Prior Publication Data

US 2023/0077454 A1    Mar. 16, 2023

(51) Int. Cl.
   *G06N 3/08* (2023.01)
   *G06N 3/049* (2023.01)
   *G06V 10/75* (2022.01)

(52) U.S. Cl.
   CPC ............... *G06N 3/08* (2013.01); *G06N 3/049* (2013.01); *G06V 10/751* (2022.01)

(58) Field of Classification Search
   CPC ........ G06N 3/08; G06N 3/049; G06N 3/0464; G06V 10/751
   USPC .......................................................... 706/15
   See application file for complete search history.

(56) References Cited

U.S. PATENT DOCUMENTS

| | | | |
|---|---|---|---|
| 2018/0373976 A1* | 12/2018 | Woo | G06N 3/042 |
| 2021/0256303 A1* | 8/2021 | Wei | G06N 20/10 |
| 2025/0131256 A1* | 4/2025 | Luk | G06N 3/04 |

OTHER PUBLICATIONS

Panda, P., Sengupta, A., & Roy, K. (Mar. 2016). Conditional deep learning for energy-efficient and enhanced pattern recognition. In 2016 design, automation & test in europe conference & exhibition (DATE) (pp. 475-480). IEEE. (Year: 2016).*

(Continued)

*Primary Examiner* — April Y Blair
(74) *Attorney, Agent, or Firm* — Schwegman Lundberg & Woessner, P.A.

(57) ABSTRACT

Dynamic data-dependent neural network processing systems and methods increase computational efficiency in neural network processing by uniquely processing data based on the data itself and/or configuration parameters for processing the data. In embodiments, this is accomplished by receiving, at a controller, input data that is to be processed by a first device in a first layer of a sequence of processing layers of a neural network using a first set of parameters. The input data is analyzed to determine whether to modify it, whether processing the (modified) data in a second layer would conserve at least one computational resource, or whether to apply a different set of parameters. Depending on the determination, the sequence of processing layers is modified, and the (modified) data are processed according to the modified sequence to reduce data movements and transitions, thereby, conserving computational resources.

18 Claims, 5 Drawing Sheets

(56) References Cited

OTHER PUBLICATIONS

Wang, M., Mo, J., Lin, J., Wang, Z., & Du, L. (Oct. 2019). Dynexit: A dynamic early-exit strategy for deep residual networks. In 2019 IEEE International Workshop on Signal Processing Systems (SiPS) (pp. 178-183). IEEE. (Year: 2019).*

Farhadi, M., Ghasemi, M., & Yang, Y. (Sep. 2019). A novel design of adaptive and hierarchical convolutional neural networks using partial reconfiguration on fpga. In 2019 IEEE High Performance Extreme Computing Conference (HPEC) (pp. 1-7). IEEE. (Year: 2019).*

* cited by examiner

100

DYNAMIC DATA-DEPENDENT NEURAL NETWORK PROCESSING SYSTEMS AND METHODS

BACKGROUND

A. Technical Field

The present disclosure relates generally to data processing in machine-learning applications. More particularly, the present disclosure relates to systems and methods for increasing computational efficiency in machine learning applications.

B. Background

Machine learning is a subfield of artificial intelligence that enables computers to learn by example without being explicitly programmed in a conventional sense. Numerous machine learning applications utilize a Convolutional Neural Network (CNN), i.e., a supervised network that is capable of solving complex classification or regression problems, for example, for image or video processing applications. A CNN uses as input large amounts of multi-dimensional training data, such as image or sensor data to learn prominent features therein. A trained network can be fine-tuned to learn additional features. In an inference phase, i.e., once training or learning is completed, the CNN uses unsupervised operations to detect or interpolate previously unseen features or events in new input data to classify objects, or to compute an output such as a regression. For example, a CNN model may be used to automatically determine whether an image can be categorized as comprising a person or an animal. The CNN applies a number of hierarchical network layers and sub-layers to the input image when making its determination or prediction. A network layer is defined, among other parameters, by kernel size. A convolutional layer may use several kernels that apply a set of weights to the pixels of a convolution window of an image. For example, a two-dimensional convolution operation involves the generation of output feature maps for a layer by using data in a two-dimensional window from a previous layer. As the amount of data subject to convolution operations increases and the complexity of operations continues to grow, the added steps of storing and retrieving intermediate results from memory to complete an arithmetic operation present only some of the shortcoming of existing designs.

Accordingly, what is needed are systems and methods that allow hardware, including conventional hardware accelerators, to efficiently perform a myriad of complex processing steps on large amounts of data at low power and, ideally, without increasing hardware cost.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
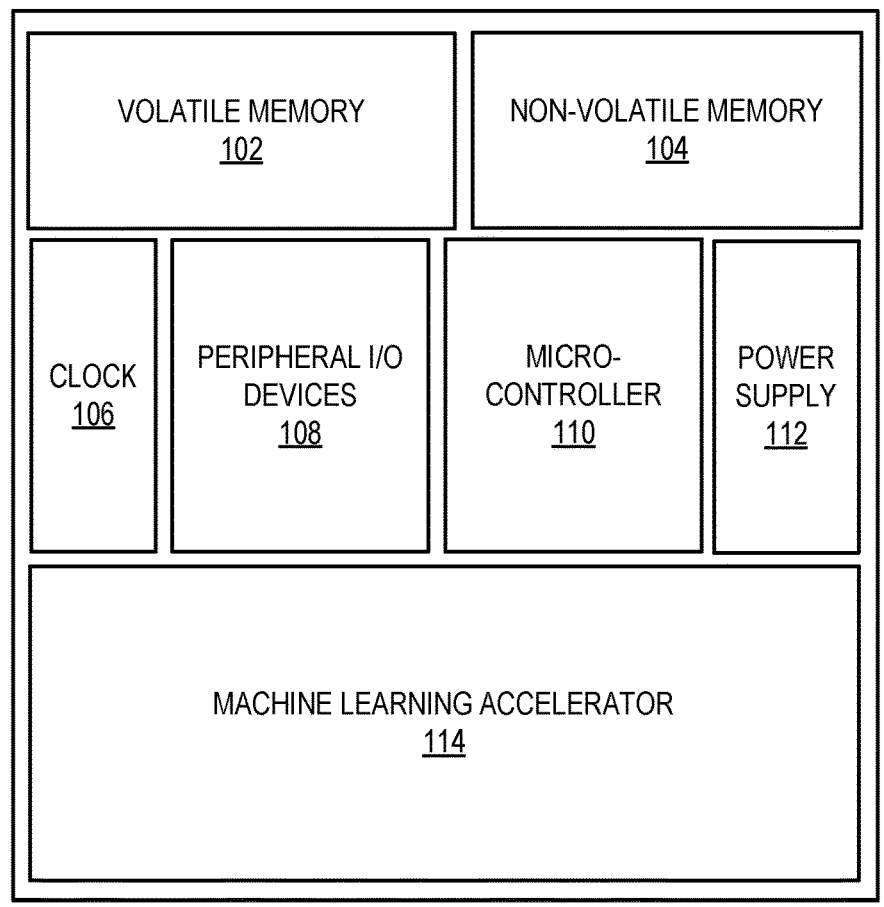
FIG. 1 shows a conventional embedded machine learning accelerator system.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

In this document the terms "optimal," "optimize," "optimization," and the like refer to an improvement of an outcome or a process and do not require that the specified outcome or process has achieved an "optimal" or peak state. The terms "include," "including," "comprise," and "comprising" shall be understood to be open terms and any lists the follow are examples and not meant to be limited to the listed items. The terms "memory," "memory device," and "register" are used interchangeably. Similarly, the terms kernel, filter, weight, parameter, and weight parameter are used interchangeably. The term "layer" refers to a neural network layer. "Neural network" includes any neural network known in the art. "Hardware accelerator" refers to any electrical or optical circuit that may be used to perform mathematical operations and related functions, including auxiliary control functions. "Circuit" includes "sub-circuits" and may refer to both custom circuits, such as special hardware, and general purpose circuits. The terms "computational resource," "computing resource" and "computational efficiency," and "data processing efficiency" refer to computing speed, network capacity, power efficiency and similar parameters (including metrics for measuring performance and computing resources, such as latency and throughput) in computing systems and other electrical circuits.

FIG. 1 illustrates a conventional embedded machine learning accelerator system that processes data in multiple stages. System 100 contains volatile memory 102, non-volatile memory 104, clock 106, clock I/O peripherals, microcontroller 110, power supply 112, and machine learning accelerator 114. Microcontroller 110 can be a traditional DSP or general-purpose computing device, machine learning accelerator 114 can be implemented as a CNN accelerator that comprises hundreds of registers (not shown). As depicted in FIG. 1, machine learning accelerator 114 interfaces with other parts of embedded machine learning accelerator system 100.

In operation, microcontroller 110 performs arithmetic operations in software. Machine learning accelerator 114 typically uses weight data to perform matrix-multiplications and related convolution computations on input data to which weight data is applied. The weight data may be unloaded from accelerator 114, for example, to load new or different weight data prior to accelerator 114 performing a new set of operations using the new set of weight data. More commonly, the weight data remains unchanged, and each new computation comprises new input data being loaded into accelerator 114 to perform computations.

Machine learning accelerator 114 lacks hardware acceleration for at least some of a number of possible neural network computations. These missing operators are typically emulated in software by using software functions embedded in microcontroller 110. However, such approaches are very costly in terms of both power and time; and for many computationally intensive applications, such as real-time applications, general purpose computing hardware is unable to perform the necessary operations in a timely manner as the rate of calculations is limited by the computational resources and capabilities of existing hardware designs.

Further, using arithmetic functions of microcontroller 110 to generate intermediate results comes at the expense of computing time due to the added steps of transmitting data, allocating storage, and retrieving intermediate results from memory locations to complete an operation. For example, many conventional multipliers are scalar machines that use CPUs or GPUs as their computation unit and use registers and a cache to process data stored in non-volatile memory, relying on a series of software and hardware matrix manipulation steps, such as address generation, transpositions, bit-by-bit addition and shifting, converting multiplications into additions and outputting the result into some internal register. In practice, these repeated read/write operations performed on a significant amount of weight parameters and input data with large dimensions and/or large channel count typically result in undesirable data movements in the data path and, thus, increase power consumption.

Existing neural network systems both load into memory and process input data, such as image or audio data, indiscriminately regardless of content or format, i.e., without examining the input data for any characteristics. However, in many instances not all data that is loaded is also processed. Moreover, the data that is processed is typically processed in a predetermined sequential manner, e.g., in a predetermined number of order of layers of a fixed neural network, based on a network model that has been trained in a particular way. The rigidity of handling large amounts of data in this traditional way results in many unnecessary preparation and computing steps that consume valuable computing resources, including computing time and power. The computational complexity involved in convolution and other operations performed by CNNs and excessive power consumption associated therewith makes more efficient hardware acceleration and power-saving particularly desirable.

Accordingly, what is needed are flexible systems and methods that can intelligently determine how to load and process input data in neural networks to optimize the use of available computational resources and drastically reduce power consumption, without negatively affecting the overall operation or performance of the computing system.

Figure 2:
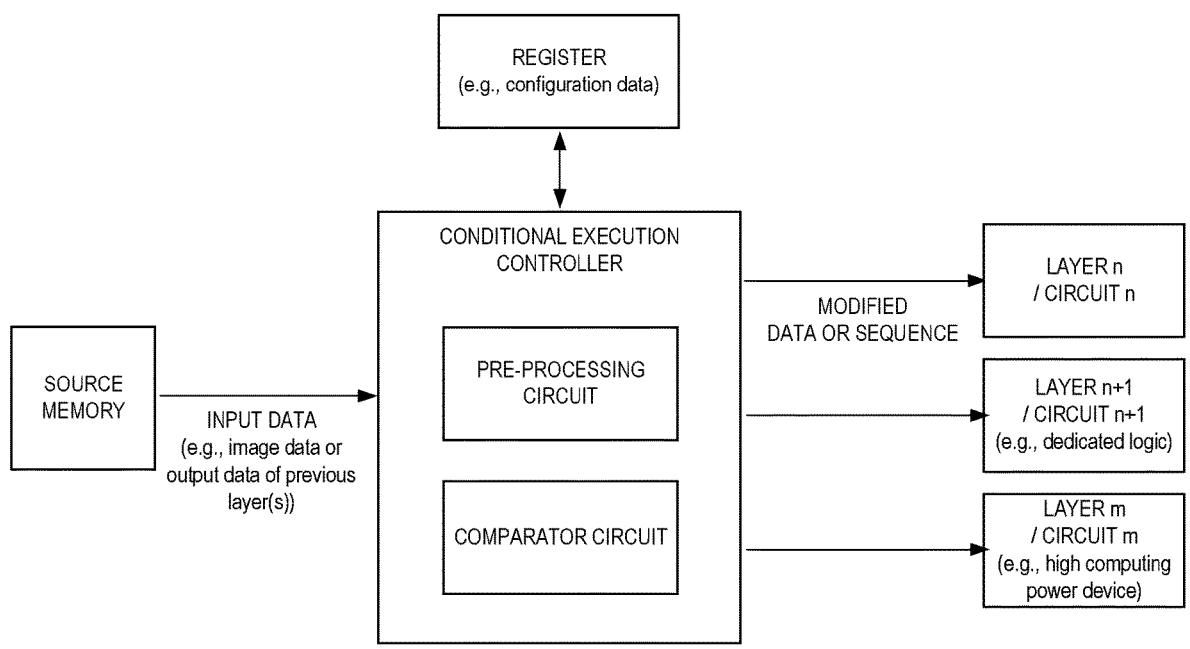
FIG. 2 illustrates a dynamic data-dependent neural network processing system according to various embodiments of the present disclosure.

FIG. 2 illustrates a dynamic data-dependent neural network processing system according to various embodiments of the present disclosure. In embodiments, system 200 may comprise a branching circuit, or a conditional execution control circuit, that is coupled to receive input data. As used herein, the term "input data" comprises raw data and also some or all data that is output by a neural network layer or a combination of two or more network layers. Data-dependent neural network processing system 200 may further comprise a register that may comprise configuration data, such as weight data or any other type of configuration information.

It is understood that, in embodiments, each compute unit in data-dependent neural network processing system 200 may be routed to each other directly or indirectly via a feedback loop (not shown), and weight memory and data memory (not shown) may be coupled to each processing unit. Each layer/circuit may act as at least partially independent computing unit that may be assigned a dedicated task, such as performing operations on some or all of an entire CNN network that may be performed in parallel.

In embodiments, the conditional execution control circuit may comprise a pre-processing circuit and a comparator circuit, e.g., a logic circuit, and may be implemented at one or more output stages of a processor. The pre-processing circuit may be implemented as a CPU, a DSP, or a logic circuit that may be implemented, e.g., in a CNN accelerator. In operation, the conditional execution control circuit may output modified data and/or a modified sequence of processing layers in which the input data is to be processed.

In embodiments, the conditional execution control circuit may further monitor and/or receive input data, such as image or audio data to be processed in a neural network layer, e.g., according to a network model that may comprise any number of neural network layers. As described in greater detail below, each individual layer may processed by one or more circuits or processors according to the objectives of the present disclosure. In embodiments, the network model may comprise an initial sequence of processing layers for which the model may have been independently trained. It is understood that more than one network model may be used, e.g., in combination with each other as a hybrid or overarching model.

In embodiments, the pre-processing circuit may analyze at least some of the input data to determine how to load some or all of the input data into a memory device (not shown) for further processing, and how to modify the input data, if at all, to increase computational efficiency. The pre-processing circuit may similarly analyze the input data to determine where and how to pre-process or process the input data and/or the modified input data (hereinafter also referred to as the "input data") in any of the neutral network layers, e.g., in a sequence that is different from the initial sequence of processing layers, such as to increase computational efficiency. In embodiments, to further increase computational efficiency, the conditional execution control circuit may obtain a set of network or configuration parameters, e.g., from the storage register, and use any number of such parameters, e.g., together with information about the input data to determine whether to modify the parameters and apply a modified set of parameters to the input data to obtain the modified data.

In embodiments, based on the analysis, the conditional execution control circuit may determine that processing a first layer by one processing device, such as a processor within a hardware accelerator, would consume a greater amount of power than processing the same network layer using another processing device, e.g., a dedicated logic circuit that may have been optimized to perform specific types of operations more efficiently when compared to the processor in the hardware accelerator.

Based on the determination, the conditional execution control circuit may divert execution of a process to another processing device and/or another network layer, e.g., to enable the processing of an arbitrary, non-sequential order of network layers. Conversely, if the conditional execution control circuit determines that processing a certain layer is likely to require a high computing capability, e.g., to extract different or more detailed features, additional high-power computing devices may be activated. In embodiments, analyzing and processing input data by itself or in combination with other data, such as weight data, e.g., to demine if and how to subsequently process data in various network layers, e.g., according to a modified sequence or in a non-sequential manner, in effect, causes the neural network to behave differently depending on the input data.

Advantageously, input data dependent changes in the sequence of processing layers may allow for an early exit, e.g., by aborting a sequence early, thereby, conserving computing resources. In addition, in embodiments, e.g., when several networks are controlled at the same time, calculations may be skipped, e.g., in image processing applications when there is no need to calculate a certain contours, such as a face, after it has been determined that no other contours, e.g., eyes have been detected, further conserving computing resources.

In embodiments, a multi-stage process may be used that, in a first stage determines, e.g., based on a probability score that is generated from or at the output of a network layer, whether an object has been detected in an image, to decide whether to continue processing layers whose task is to detect finer contours. In audio applications, a conditional execution control circuit may evaluate output data from a network layer to determine, e.g., at a first stage, whether an audio signal comprises sufficient spectral energy to decide at a second stage whether to continue processing other network layers intended to detect speech. In addition, in embodiments, input data may be first evaluated to detect one or more environmental characteristics, such as noise, before deciding which path a branching circuit should take.

In embodiments, data-dependent decisions may be made at a hardware boundary, such as an input of a processor, or at a logical boundary. In addition, decisions may be made at a channel boundary or a layer boundary. It is understood that at least some of the input data of a network layer in a neural network may be the output of a preceding network layer in that neural network.

In embodiments, decisions may be made by evaluating the input data in-place, i.e., before it is transmitted to a processing device or written out to memory. For example, a decision may be made between the time an output is transferred to or written and a next batch of input data is received. In other words, unlike in software applications, decisions may be made without transferring data in and out of memory, thus, greatly saving time and computing resources. In addition, in embodiments, decisions may advantageously be made in a single processing cycle.

In embodiments, analyzing the input data may comprise using statistical tools and the comparator to detect a trend in the input data or an anomaly when compared to previous data, e.g., a trend or anomaly that may have been learned in a training phase of the neural network. Exemplary statistical computations may comprise evaluating a probability score, a ReLu function or any other statistical function. For example, at least a portion of the input data may be compared to an average value, a maximum, a value range, an address range, an address region, or other metric that may be representative of a result, such as an intermediate or cumulative result, or a statistical sampling, a mini-batch, or time-variable result. In embodiments, this may be accomplished by the comparator circuit, a state machine, or logic that performs a number of comparisons based on the input data, e.g., to make a comparison of present data to previous data to determine a trend or anomaly, e.g., to automatically determine when and how to modify a processing sequence (or terminate a processing sequence) and also where to write output data.

In image processing, once a network has identified an object to a certain degree, input data may be processed using one of the layers of a different network to perform tasks to aid in identifying a related object. Conversely, in response to not detecting, e.g., a number of contours in image data associated with a scene, processes tasked with identifying certain objects may be halted altogether and/or a new set of input data may be loaded, for example from a different source. In embodiments, different kernels may be used to perform weight tuning, or a different network may be used, or the same network may be used with different kernels to detect different features. Advantageously, such embodiments, too, may be performed without writing out the input data to a memory device.

In embodiments, to reduce a number of unnecessary computations and, thus, conserve computational resources, a modified processing sequence may comprise halting the processing of at least one of the sequence of processing layers based on a stop condition, such as a conditional expression comprising a value, a range of values at certain addresses, and the like, e.g., in response to determining that an expected accuracy gain is unlikely to be met. In embodiments, instead of using a stop condition to terminate network layers, the processing of one or more network layers may be delayed. Other exemplary decisions comprise restarting or rerouting related processes. In embodiments, addressing may involve setting a bit to instruct a hardware accelerator to resume operations at a specific address in memory, e.g., one that corresponds to a different branch of a network layer.

It is understood that, in embodiments, results from any number of layers/circuits may be combined in any suitable manner. For example, for a given application, one or more circuits may be used to generate one type of data that is different from another number of circuits. Further, any number of layers/circuits may be disabled individually or in combination, e.g., depending on a number of inputs that system 200 receives for processing at any given time for a particular application.

In embodiments, the conditional execution control circuit may select any number of layers/circuits that should process a certain neural network layer within a CNN to produce a desired result, e.g., based on user-programmable register values, which may be associated with one or more performance metrics. The conditional execution control circuit may, for example, use the pre-processor to take into account parameters such as capacities, e.g., throughput, and availability of each circuit, network layer information, information regarding processed data, and configuration information such as, e.g., input or output data sizes.

The pre-processor may further use at least some parameters to estimate durations for certain processes for various possible combinations, e.g., to evaluate a power demand or whether one circuit or circuit should be used more often for a certain task than another circuit. For example, the pre-processor may determine that operating three circuits at one time is computationally less expensive than operating a certain processor three times to obtain the same result. In response, the pre-processor may dynamically schedule and prioritize layers/circuits accordingly, e.g., to reduce overall system power consumption. In embodiments, the pre-processor may select one circuit to perform a dedicated task and cause other circuits to be halted to save power, for example, in instances where less computing power is acceptable.

In embodiments, a selected circuit may have different capabilities than a non-selected circuit. For example, a relatively smaller circuit or special purpose low-power logic that carries less computational overhead may be selected, e.g., on a per-layer basis, to perform particular operations, such as arithmetic computations more efficiently, faster, and using less power. And a circuit may be optimized to process specific types of input data, which may comprise predetermined configuration parameters that reduce configuration computation times.

In embodiments, the pre-processing circuit may determine which circuits/layers should be selected under which circumstances, including when to switch to different configurations or a previously used circuit, e.g., a general purpose processor. Overall, dynamic circuit selection advantageously reduces power consumption and increases computational efficiency performance.

In embodiments, dynamic circuit selection may be accomplished using the comparator circuit, which may comprise any logic elements known in the art, or the conditional execution control circuit discussed below with reference to FIG. 4. In embodiments, the pre-processing circuit may dynamically select any number of configuration or network parameters, e.g., parameters associated with an output from a network layer of a neural network, to match a characteristic, such as a performance metric of a given circuit/layer.

It is understood that data-dependent neural network processing 200 in FIG. 2 is not limited to the constructional detail shown there or described in the accompanying text. Those skilled in the art will appreciate that a suitable system may comprise different or additional elements and/or connections, including storage devices.

Figure 3:
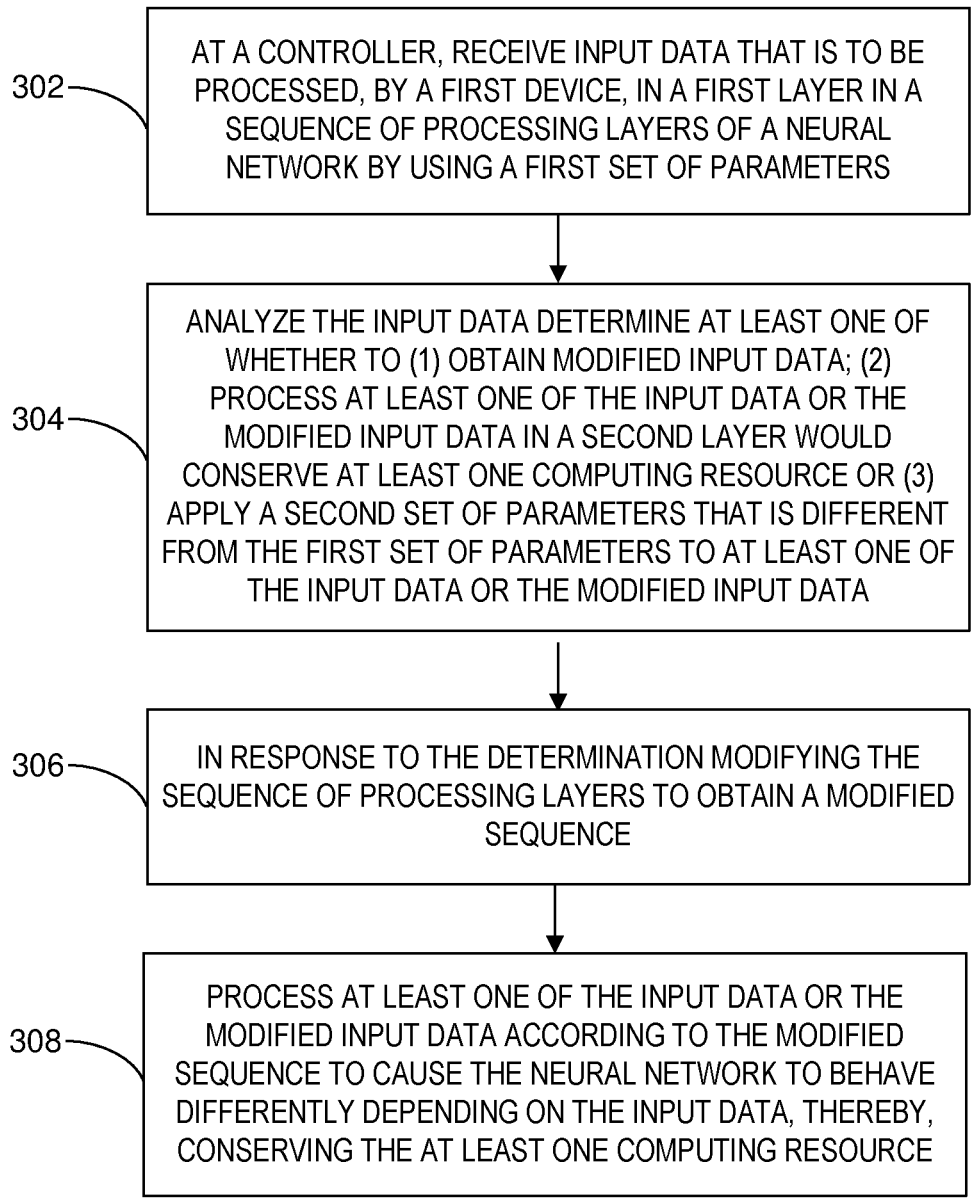
FIG. 3 is a flowchart for dynamic data-dependent neural network processing according to various embodiments of the present disclosure.

FIG. 3 is a flowchart of dynamic data-dependent neural network processing according to various embodiments of the present disclosure. In one or more embodiments, process 300 may begin, at step 302, when, at a controller, input data is received that is to be processed by a first device in a first layer, e.g., in a sequence of processing layers of a neural network, by using a first set of parameters. In embodiments, at least some of the input data may comprise data that has been output by a previous network layer, i.e., one that precedes the first layer in the neural network.

At step 304, the input data may be analyzed to make a determination regarding at least one of (1) whether to obtain modified input data; (2) whether to process at least one of the input data or the modified input data in a second layer would conserve at least one computing resource; or (3) whether to apply a second set of parameters that is different from the first set of parameters to the input data or modified input data. In embodiments, the second layer may be processed by a second device distinct from the first device, e.g., after delaying a process in the first layer.

At step 306, in response to the determination, which may be made at a hardware or logical boundary, e.g., a channel or layer boundary, the sequence of processing layers may be modified to obtain a modified sequence. In embodiments, the modified sequence may comprise a stop condition that terminates the processing of at least one processing layer in the sequence, e.g., to conserve a computing resource.

In embodiments, the determination may be made by the controller in a single processing cycle by using a state machine or logic circuit implemented in a CNN accelerator, e.g., after analyzing the input data without writing it to a memory device and further analyzing the first and/or second set of parameters, e.g., by comparing the input data to an average, region, address range, or value range. In embodiments, the control circuit may determine a trend and/or anomaly that is associated with the input data and that may have been learned in a training phase.

Finally, at step 308, the modified input data may be processed according to the modified sequence to cause the neural network to behave differently depending on the input data, thereby, conserving computing resources. One skilled in the art shall recognize that: (1) certain steps herein may optionally be performed; (2) steps may not be limited to the specific order set forth herein; (3) certain steps may be performed in different orders; and (4) certain steps may be performed concurrently.

Figure 4:
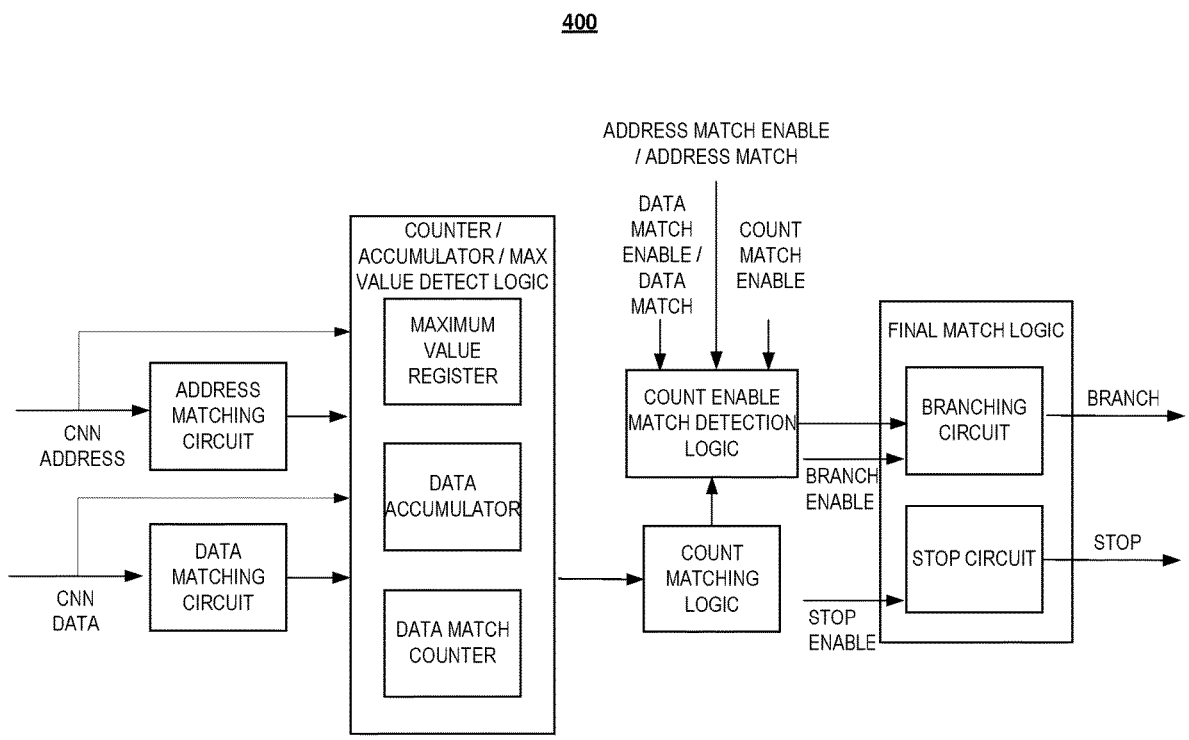
FIG. 4 is a block diagram illustrating an exemplary conditional execution control circuit according to various embodiments of the present disclosure.

FIG. 4 is a block diagram illustrating an exemplary conditional execution control circuit according to various embodiments of the present disclosure. In embodiments, one or more functions may be accomplished by a conditional execution control circuit that may be implemented in a processor, such as a neural network hardware accelerator, and may be configurable through an advanced peripheral bus (APB). In embodiments, conditional execution control circuit may be used to monitor CNN output channel write addresses and/or data and provide status and/or control for future CNN executions, e.g., on a per-layer basis based on comparison results and selected functions.

In embodiments, execution control may comprise (1) continuing with sequential layer execution, (2) forcing execution to branch to a specified layer, and (3) halting execution, e.g., to prevent certain types of input data from being used or processed to reduce unnecessary and computationally expensive data movements, such as those requiring read, write, buffer, and data storage operations, thereby, greatly reducing power consumption. Execution control may be enabled, e.g., at a layer boundary following the detection of a selected condition. As discussed in greater detail below, a conditional execution control circuit may comprise address and data matching, and counting circuits.

In embodiments, address and data matching circuits may be cross coupled ahead of each counting circuit to create more elaborate matching functions. Additionally, the output of each matching circuit following the counters may be used independently or in combination to control branching and stopping. In embodiments, matching conditions and counting/accumulation functions may be controlled using registers, which may be accessible through an APB interface that may be used to also read count/accumulation results and control signals.

As depicted in FIG. 4, conditional execution control circuit may comprise an address matching circuit, a data matching circuit, a counter/accumulator/max value detect logic, which comprises a data match counter, a data accumulator, and a maximum value register, a count enable match detection logic, a count matching logic, and a final match logic that comprises a branching circuit and a stop circuit.

In embodiments, a common design may be used for matching CNN output channel write address, data, or resultant count/accumulator results. In embodiments, three APB-accessible register bits may determine a selected matching function, and two APB-accessible registers may determine matching values. Each matching circuit may be enabled when a selected layer is active and a global match enable signal is active. For data matching functions, one or more byte values may be compared. For example, if one byte is selected, the output of one sub-circuit may be used. If two bytes are selected, the outputs of two sub-circuits may be used, e.g., zero and one. And if three bytes are used the outputs of three sub-circuits may be compared. Conversely, if no bytes are enabled to compare outputs, a zero value may be forced for those bits.

In embodiments, count enable match detection logic may determine conditions in which the counter/accumulators are enabled. In FIG. 4, two APB-accessible register bits determine the selected matching function. In embodiments, counter/accumulator/max value detect logic may extend the functionality of the matching circuit by adding match functionality to data dependent content. Counts or accumulated results may be read through the APB, and selected results may be evaluated by dedicated matching logic. None, one, or more functions may be simultaneously enabled from which one function may be selected for comparison.

In embodiments, the data match counter may allow the number of cycles that match conditions to be accumulated. The counter may increment once each clock cycle when a match condition is detected and may be cleared through the APB interface, e.g., by writing the register to zero. A binary counter may be, e.g., 32-bit wide. The resulting accumulator value may be selected and compared to user-programmable register values according to the function select logic identified in the address, data, and count matching circuits.

In embodiments, the data accumulator may add the data value present during a match cycle to produce a cumulative count value for all match cycles. The counter may be cleared through the APB interface by writing the register to zero and add the CNN data value present to an accumulator at each clock cycle a match condition is detected. As with the data match counter, this binary counter may also be, e.g., 32-bit wide, and the resulting accumulator value may be selected and compared to user-programmable register values according to the function select logic identified by the address, data, and count matching circuits.

In embodiments, the maximum value register may load the data value present during a match cycle where the input data value is greater than the value currently stored in the register. In addition, the address accompanying this data value may be loaded into a corresponding address register. The counter may be cleared through the APB interface by writing the register to zero and may load the CNN data value present to an accumulator each clock a match condition is detected and the input value is greater than the current register value. The data register may be, e.g., 32-bit wide, and the accompanying address register may be, e.g., 21 bits in width. The resulting registered data value may be selected and compared to a user-programmable register values according to the function select logic identified by the address, data, and count matching circuits. One of the previously described values may be selected and passed to a user-definable comparison function.

In embodiments, the final match logic may determine whether a match condition has been met, e.g., to enable a stop or branch at the end of a layer where the match was detected. A function may select any combination of the address, data, or count/accumulators match outputs. In embodiments, if any of the match circuits are disabled, they are effectively excluded from the match logic. If a match type, i.e., address, data, or count/accumulator, is enabled, a match signal from the associated matching logic may be logically AND'ed to the other active match type results. If all enabled match results are true, the overall match is true and may be fed forward to the branch or stop logic.

If either the stop or branch function is enabled, and all conditions match, the associated action may take place at the end of the current network layer. If both stop and branch options are enabled, and all enabled match conditions are met, the stop may take priority. In embodiments that comprise two or more independent match circuits, each may be configured independently and independently operate in parallel. Any number of branch conditions may be configured and triggered within a single network. In embodiments, if one or more branch or match circuits are configured, priority coding or a configurable priority may be used to select the branch or stop condition that is executed.

Figure 5:
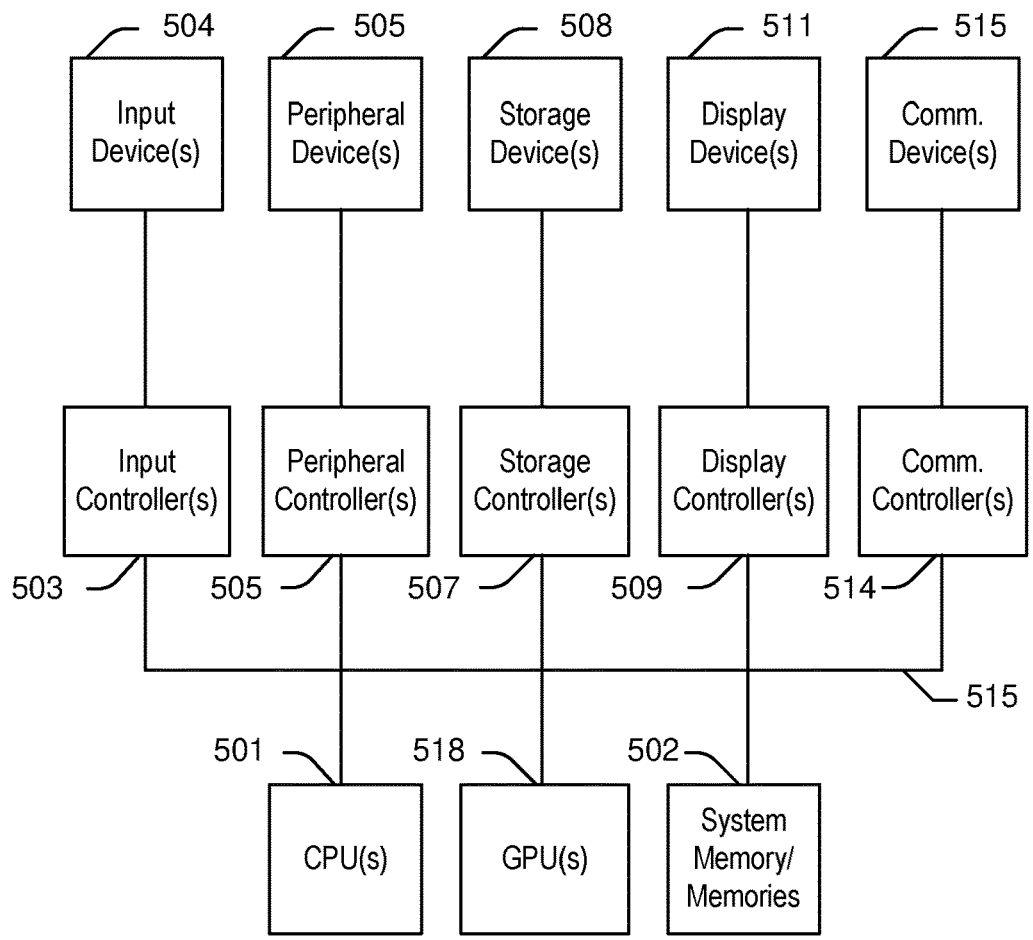
FIG. 5 depicts a simplified block diagram of a computing device/information handling system, in accordance with embodiments of the present disclosure.

FIG. 5 depicts a simplified block diagram of an information handling system (or computing system) according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more CPUs 501 that provides computing resources and controls the computer. CPU 501 may be implemented with a microprocessor or the like, and may also include one or more graphics processing units 519 and/or a floating-point coprocessor for mathematical computations. System 500 may also include a system memory 502, which may be in the form of random-access memory (RAM), read-only memory (ROM), or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 506 may also be used to store processed data or data to be processed in accordance with the disclosure. The system 500 may also include a display controller 509 for providing an interface to a display device 511, which may be a cathode ray tube (CRT), a thin film transistor (TFT) display, organic light-emitting diode, electroluminescent panel, plasma panel, or other type of display. The computing system 500 may also include one or more peripheral controllers or interfaces 505 for one or more peripherals 508. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. Processed data and/or data to be processed in accordance with the disclosure may be communicated via the communications devices 515.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, PLDs, flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A dynamic data-dependent neural network processing method comprising:
　at a controller, receiving input data that is to be processed in a first layer in a sequence of processing layers of a neural network by using a first set of parameters, the first layer to be processed by a first device;
　analyzing the input data in the controller to make a determination regarding at least one of:
　　whether to obtain modified input data that would increase computational efficiency of at least one computational resource;
　　whether to process at least one of the input data or the modified input data in a second layer would increase computational efficiency of the at least one computational resource; or
　　whether to apply a second set of parameters that is different from the first set of parameters to at least one of the input data or the modified input data would increase computational efficiency of the at least one computational resource;
　in response to the determination, modifying the sequence of processing layers of the neural network to obtain a modified sequence that uses each of the processing layers; and processing at least one of the input data or the modified input data according to the modified sequence to cause the neural network to behave differently depending on the input data to increase computational efficiency of the at least one computational resource.

2. The method according to claim 1, wherein the determination is made at least at one of a hardware boundary or a logical boundary comprising at least at one of a channel boundary or a layer boundary.

3. The method according to claim 1, wherein at least some of the input data is an output of a preceding layer of the neural network, wherein the preceding layer precedes the first layer in the neural network.

4. The method according to claim 1, wherein the second layer is processed by a second device that is distinct from the first device and wherein the determination is made prior to at least one of the first device and the second device receiving at least one of the input data or the modified input data.

5. The method according to claim 1, wherein analyzing the input data comprises determining at least one of a trend or an anomaly associated with the input data.

6. The method according to claim 1, further comprising analyzing at least one of the first set of parameters or the second set of parameters.

7. The method according to claim 1, wherein analyzing the input data comprises comparing at least a portion of the input data to at least one of an average, a region, an address range, or a value range.

8. The method according to claim 1, wherein analyzing the input data is performed in the controller without writing out the input data to a memory device.

9. The method according to claim 1, wherein the second layer is processed after delaying a processing of the first layer.

10. A non-transitory machine-readable storage medium comprising instructions, which when executed by circuitry of a computing device, causes the circuitry to perform a dynamic data-dependent neural network processing method with operations comprising:
    receiving input data that is to be processed in a layer in a sequence of processing layers of a neural network by using a first set of parameters, the layer to be processed by a first device;
    analyzing the input data to make a determination regarding at least one of:
      whether to obtain modified input data that would increase computational efficiency of at least one computational resource;
      whether to process at least one of the input data or the modified input data in another layer of the sequence of processing layers of the neural network would increase computational efficiency of the at least one computational resource; and
      whether to apply a second set of parameters that is different from the first set of parameters to at least one of the input data or the modified input data would increase computational efficiency of the at least one computational resource;
    in response to the determination, modifying the sequence of processing layers of the neural network to obtain a modified sequence that uses each of the processing layers; and
    processing at least one of the input data or the modified input data according to the modified sequence to cause the neural network to behave differently depending on the input data to increase computational efficiency of the at least one computational resource.

11. The non-transitory machine-readable storage medium according to claim 10, wherein analyzing the input data is performed without writing out the input data to a memory device.

12. The non-transitory machine-readable storage medium according to claim 10, wherein the determination is made at least at one of a channel boundary or a layer boundary.

13. The non-transitory machine-readable storage medium according to claim 10, wherein analyzing the input data comprises determining at least one of a trend or an anomaly that is associated with the input data and has been learned in a training phase.

14. A dynamic data-dependent neural network processing system comprising:
    a source memory to hold input data that is to be processed in a first layer in a sequence of processing layers of a neural network by using a first set of parameters, the first layer to be processed by a first device;
    a conditional execution control circuit coupled to the source memory, the conditional execution control circuit comprising:
      a pre-processing circuit; and
      a comparator circuit;
      wherein the pre-processing circuit analyzes the input data to make a determination regarding at least one of:
        whether to obtain modified input data that would increase computational efficiency of at least one computational resource;
        whether processing at least one of the input data or the modified input data in a second layer would increase computational efficiency of the at least one computational resource; or
        whether to apply a second set of parameters that is different from the first set of parameters to at least one of the input data or the modified input data would increase computational efficiency of the at least one computational resource;
      wherein the pre-processing circuit, in response to the determination, modifies the sequence of processing layers of the neural network to obtain a modified sequence that uses each of the processing layers and processes at least one of the input data or the modified input data according to the modified sequence; and
    a register to hold at least the first and second set of parameters.

15. The system according to claim 14, wherein the comparator circuit compares at least a portion of the input data to at least one of an average, a region, an address range, or a value range.

16. The system according to claim 14, wherein the pre-processing circuit comprises a state machine.

17. The system according to claim 14, wherein the pre-processing circuit comprises a logic circuit that is implemented in a CNN accelerator.

18. The system according to claim 14, wherein the pre-processing circuit analyzes the input data without writing out the input data to a memory device.

* * * * *